United States Patent
Zopf et al.

(10) Patent No.: US 8,578,247 B2
(45) Date of Patent: Nov. 5, 2013

(54) BIT ERROR MANAGEMENT METHODS FOR WIRELESS AUDIO COMMUNICATION CHANNELS

(75) Inventors: Robert W. Zopf, Ranch Santa Margarita, CA (US); Vivek Kumar, San Jose, CA (US); Michael S. Gustafson, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 488 days.

(21) Appl. No.: 12/431,184

(22) Filed: Apr. 28, 2009

(65) Prior Publication Data

US 2009/0282298 A1 Nov. 12, 2009

Related U.S. Application Data

(60) Provisional application No. 61/051,546, filed on May 8, 2008.

(51) Int. Cl.
*H03M 13/00* (2006.01)

(52) U.S. Cl.
USPC ............................. 714/774; 714/3; 714/747

(58) Field of Classification Search
USPC ........................................................ 714/774
See application file for complete search history.

(56) References Cited

U.S. PATENT DOCUMENTS

| | | | | |
|---|---|---|---|---|
| 4,701,923 A * | 10/1987 | Fukasawa et al. | ............ | 714/774 |
| 4,719,642 A * | 1/1988 | Lucas | ............ | 375/249 |
| 4,764,927 A * | 8/1988 | Izumita et al. | ................ | 714/761 |
| 5,325,374 A * | 6/1994 | Hoshi et al. | ................... | 714/759 |
| 6,170,073 B1 * | 1/2001 | Jarvinen et al. | ............... | 714/758 |
| 6,732,321 B2 * | 5/2004 | Classon et al. | ................ | 714/774 |
| 6,851,084 B2 * | 2/2005 | Pattavina | ....................... | 714/776 |
| 6,910,175 B2 * | 6/2005 | Krishnamachari | ........... | 714/774 |
| 7,069,208 B2 * | 6/2006 | Wang | ............................ | 704/211 |
| 7,107,055 B2 * | 9/2006 | Gallagher et al. | ............. | 455/436 |
| 7,225,381 B1 * | 5/2007 | Lehman | ........................ | 714/746 |
| 7,454,171 B2 * | 11/2008 | Palin et al. | ..................... | 455/41.2 |
| 7,855,973 B2 * | 12/2010 | Bloebaum | ..................... | 370/252 |
| 2002/0085531 A1 * | 7/2002 | Herrmann et al. | ............. | 370/338 |

OTHER PUBLICATIONS

Specification of the Bluetooth System: Wireless Connections Made Easy, Covered Core Package version: 2.1 + EDR, (Jul. 26, 2007), 1420 pages.

* cited by examiner

*Primary Examiner* — Steve Nguyen
(74) *Attorney, Agent, or Firm* — Fiala & Weaver P.L.L.C.

(57) ABSTRACT

Systems and methods are described for managing bit errors present in an encoded bit stream representative of a portion of an audio signal, wherein the encoded bit stream is received via a channel in a wireless communications system. The channel may comprise, for example, a Synchronous Connection-Oriented (SCO) channel or an Extended SCO (eSCO) channel in a Bluetooth® wireless communications system.

30 Claims, 7 Drawing Sheets

BIT ERROR MANAGEMENT METHODS FOR WIRELESS AUDIO COMMUNICATION CHANNELS

CROSS-REFERENCE TO RELATED APPLICATIONS

This application claims priority to U.S. Provisional Patent Application No. 61/051,546, filed May 8, 2008, the entirety of which is incorporated by reference herein.

BACKGROUND OF THE INVENTION

1. Field of the Invention

The invention generally relates to systems and methods for improving the quality of an audio signal transmitted within an audio communications system.

2. Background

In audio coding (sometimes called "audio compression"), a coder encodes an input audio signal into a digital bit stream for transmission. A decoder decodes the bit stream into an output audio signal. The combination of the coder and the decoder is called a codec. The transmitted bit stream is usually partitioned into frames, and in packet transmission networks, each transmitted packet may contain one or more frames of a compressed bit stream. In wireless or packet networks, sometimes the transmitted frames or the packets are erased or lost. This condition is often called frame erasure in wireless networks and packet loss in packet networks. Frame erasure and packet loss may result, for example, from corruption of a frame or packet due to bit errors. For example, such bit errors may prevent proper demodulation of the bit stream or may be detected by a forward error correction (FEC) scheme and the frame or packet discarded.

It is well known that bit errors can occur in any audio communications system. The bit errors may be random or bursty in nature. Generally speaking, random bit errors have an approximately equal probability of occurring over time, whereas bursty bit errors are more concentrated in time. As previously mentioned, bit errors may cause a packet to be discarded. In many conventional audio communications systems, packet loss concealment (PLC) logic is invoked at the decoder to try and conceal the quality-degrading effects of the lost packet, thereby avoiding substantial degradation in output audio quality. However, bit errors may also go undetected and be present in the bit stream during decoding. Some codecs are more resilient to such bit errors than others. Some coders, such as CVSD (Continuously Variable Slope Delta Modulation), were designed with bit error resiliency in mind, while others, such as A-law or u-law pulse code modulation (PCM), are extremely sensitive to even a single bit error. Model-based codecs such as the CELP (Code Excited Linear Prediction) family of audio coders may have some very sensitive bits (e.g., gain, pitch bits) and some more resilient bits (e.g., spectral envelope).

Today, many wireless audio communications systems and devices are being deployed that operate in accordance with Bluetooth®, an industrial specification for wireless personal area networks (PANs). Bluetooth® provides a protocol for connecting and exchanging information between devices such as mobile phones, laptops, personal computers, printers, and headsets over a secure, globally unlicensed short-range radio frequency.

The original Bluetooth® audio transport mechanism is termed the Synchronous Connection-Oriented (SCO) channel, which supplies full-duplex data with a 64 kbit/s rate in each direction. There are three codecs defined for SCO channels: A-law PCM, u-law PCM, and CVSD. CVSD is used almost exclusively due to its robustness to random bit errors. With CVSD, the audio output quality degrades gracefully as the occurrence of random bit errors increases. However, CVSD is not robust to bursty bit errors, and as a result, annoying "click-like" artifacts may become audible in the audio output when bursty bit errors occur. With other codecs such as PCM or CELP-based codecs, audible clicks may be produced by even a few random bit-errors.

In a wireless communications system such as a Bluetooth® system, bit errors may become bursty under certain interference or low signal-to-noise ratio (SNR) conditions. Low SNR conditions may occur when a transmitter and receiver are at a distance from each other. Low SNR conditions might also occur when an object (such as a body part, desk or wall) impedes the direct path between a transmitter and receiver. Because a Bluetooth® radio operates on the globally available unlicensed 2.4 GHz band, it must share the band with other consumer electronic devices that also might operate in this band including but not limited to WiFi® devices, cordless phones and microwave ovens. Interference from these devices can also cause bit errors in the Bluetooth® transmission.

Bluetooth® defines four packet types for transmitting SCO data—namely, HV1, HV2, HV3, and DV packets. HV1 packets provide ⅓ rate FEC on a data payload size of 10 bytes. HV2 packets provide ⅔ rate FEC on a data payload size of 20 bytes. HV3 packets provide no FEC on a data payload of 30 bytes. DV packets provide no FEC on a data payload of 10 bytes. There is no cyclic redundancy check (CRC) protection on the data in any of the payload types. HV1 packets, while producing better error recovery than other types, accomplish this by consuming the entire bandwidth of a Bluetooth® connection. HV3 packets supply no error detection, but consume only two of every six time slots. Thus, the remaining time slots can be used to establish other connections while maintaining a SCO connection. This is not possible when using HV1 packets for transmitting SCO data. Due to this and other concerns such as power consumption, HV3 packets are most commonly used for transmitting SCO data.

A Bluetooth® packet contains an access code, a header, and a payload. While a ⅓ FEC code and an error-checking code protect the header, low signal strength or local interference may result in a packet being received with an invalid header. In this case, certain conventional Bluetooth® receivers will discard the entire packet and employ some form of PLC to conceal the effects of the lost data. However, with HV3 packets, because only the header is protected, bit errors impacting only the user-data portion of the packet will go undetected and the corrupted data will be passed to the decoder for decoding and playback. As mentioned above, CVSD was designed to be robust to random bit-errors but is not robust to bursty bit-errors. As a result, annoying "click-like" artifacts may become audible in the audio output when bursty bit-errors occur.

Recent versions of the Bluetooth specification (in particular, version 1.2 of the Bluetooth® Core Specification and all subsequent versions thereof) include the option for Extended SCO (eSCO) channels. In theory, eSCO channels eliminate the problem of undetected bit errors in the user-data portion of a packet by supporting the retransmission of lost packets and by providing CRC protection for the user data. However, in practice, it is not that simple. End-to-end delay is a critical component of any two-way audio communications system and this limits the number of retransmissions in eSCO channels to one or two retransmissions. Retransmissions also increase power consumption and will reduce the battery life of a Bluetooth® device. Due to this practical limit on the number of retransmissions, bit errors may still be present in the received packet. One approach to this issue is to simply declare a packet loss and employ PLC. However, in most cases, there may only be a few random bit errors present in the data, in which case, better quality may be obtained by allowing the data to be decoded by the decoder as opposed to discarding the whole packet of data and concealing with PLC. As a result, the case of bit-error-induced artifacts must still be handled with eSCO channels.

BRIEF SUMMARY OF THE INVENTION

The present invention provides systems and methods for managing bit errors present in an encoded bit stream representative of a portion of an audio signal, wherein the encoded bit stream is received via a channel in a wireless communications system. The channel may comprise, for example, a Synchronous Connection-Oriented (SCO) channel or an Extended SCO (eSCO) channel in a Bluetooth® wireless communications system, although the invention is not so limited.

In particular, a method for managing bit-errors present in an encoded bit stream representative of a portion of an audio signal is described herein. In accordance with the method, an encoded bit stream is received over a communication channel. The encoded bit stream is decoded to produce a series of decoded digital audio samples. At least the encoded bit stream and/or the series of decoded digital audio samples are analyzed to estimate a distribution, extent and/or location of bit errors in the encoded bit stream. Based on at least the estimated distribution, extent and/or location of bit errors in the encoded bit stream, one of a plurality of means for producing a series of digital audio samples representative of the portion of the audio signal is selected. The series of digital audio samples produced by the selected means are converted into a form suitable for playback to a user.

A system is also described herein. The system includes a demodulator/channel decoder, an audio decoder, a bit error detection and concealment block and a digital to analog converter. The demodulator/channel decoder is configured to receive a modulated carrier signal from an antenna and to generate an encoded bit stream representative of a portion of an audio signal therefrom. The audio decoder is configured to decode the encoded bit stream to produce a series of decoded digital audio samples. The bit error detection and concealment block is configured to analyze at least the encoded bit stream and/or the series of decoded digital audio samples to estimate a distribution, extent and/or location of bit errors in the encoded bit stream and to select one of a plurality of means for producing a series of digital audio samples representative of the portion of the audio signal based on at least the estimated distribution, extent and/or location of bit errors in the encoded bit stream. The digital to analog converter is configured to convert the series of digital audio samples produced by the selected means into an analog audio signal suitable for playback to a user.

A further method for managing bit-errors present in an encoded bit stream representative of a portion of an audio signal is also described herein. In accordance with the method, the encoded bit stream is received over a communication channel. A data cyclic redundancy check (CRC) indicator associated with the encoded bit stream is generated. The encoded bit stream is decoded to produce a series of decoded digital audio samples. It is determined whether bit errors are present in the encoded bit stream based on the data CRC indicator. Responsive to a determination that bit errors are present in the encoded bit stream, the following steps are performed: at least the encoded bit stream and/or the series of decoded digital audio samples are analyzed to estimate a distribution, extent and/or location of bit errors in the encoded bit stream; one of a plurality of means for producing a series of digital audio samples representative of the portion of the audio signal is then selected based on at least the estimated distribution, extent and/or location of bit errors in the encoded bit stream; then the series of digital audio samples produced by the selected means is converted into a form suitable for playback to a user.

A further system is described herein. The system includes a demodulator/channel decoder, an audio decoder, a bit error detection and concealment block and a digital to analog converter. The demodulator/channel decoder is configured to receive a modulated carrier signal from an antenna and to generate an encoded bit stream representative of a portion of an audio signal therefrom. The demodulator/channel decoder is further configured to generate a data CRC indicator associated with the encoded bit stream. The audio decoder is configured to decode the encoded bit stream to produce a series of decoded digital audio samples. The bit error concealment block is configured to determine if bit errors are present in the encoded bit stream based on the data CRC indicator and, responsive to determining that bit errors are present in the encoded bit stream, to analyze at least the encoded bit stream and/or the series of decoded digital audio samples to estimate a distribution, extent and/or location of the bit errors in the encoded bit stream and to select one of a plurality of means for producing a series of digital audio samples representative of the portion of the audio signal based on at least the estimated distribution, extent and/or location of the bit errors in the encoded bit stream. The digital to analog converter is configured to convert the series of digital audio samples produced by the selected means into an analog audio signal suitable for playback to a user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

The following Sections describe improved systems and methods for managing bit errors present in an encoded bit stream representative of a portion of an audio signal, wherein the encoded bit stream is received via a channel in a wireless communications system. In particular, Section B will describe a particular embodiment in which the wireless communications system is a Bluetooth® wireless communications system and the channel is a Synchronous Connection-Oriented (SCO) channel. Section C will describe a particular embodiment in which the wireless communications system is a Bluetooth® wireless communication system and the channel is an Extended SCO (eSCO) channel. However, the principles underlying the systems and methods described in the following Sections may be used in communications systems other than Bluetooth® communications systems. For example, the systems and methods described herein may advantageously be used in any communications system that transports audio in the form of an encoded bit stream. Thus, the present invention is not limited to implementation in a Bluetooth® communications system.

B. Management of Bit Errors for SCO Channels

As noted in the Background Section above, a Bluetooth® communications system supports (SCO) channels for transmitting and receiving data. In SCO channels, a ⅓ Forward Error Correction (FEC) code and an error-checking code protect the header, while for HV3 packets (the most commonly-used packet type for carrying audio data over SCO channels) the user-data portion is left unprotected. In certain conventional Bluetooth® receivers, a header failure generally results in the declaration of a lost packet and the use of packet loss concealment (PLC) to mitigate the effects of the lost data. However, assuming HV3 packets are used, bit errors that affect only the user-data portion of the packet will be undetected and the corrupted data will be decoded by the decoder and played out to the user. Where a CVSD decoder is used and the bit errors are bursty in nature, annoying "click-like" artifacts may become audible in the audio output.

In accordance with an embodiment of the present invention to be described in this Section, improved audio output quality may be obtained by implementing a bit error detection and concealment block at the decoder that is configured to estimate a distribution, extent and/or location of bit errors in an encoded bit stream received over the SCO channel. The bit error detection and concealment block is further configured to select an appropriate method for mitigating the effects of such bit errors based on at least the estimated distribution, extent and/or location of bit errors in the encoded bit stream. For example, in an embodiment in which the decoder is a CVSD decoder and the estimation performed by the bit error detection and concealment block suggests that bursty bit errors are present in the encoded bit stream, the selected method may be PLC since a CVSD decoder is not robust to bursty bit errors. In further accordance with such an embodiment, if the estimation performed by the bit error detection and concealment block suggests that only a few random bit errors are present in the encoded bit stream, the selected method may be to let the CVSD decoder decode the encoded bit stream since a CVSD decoder is robust to random bit errors.

Figure 1:
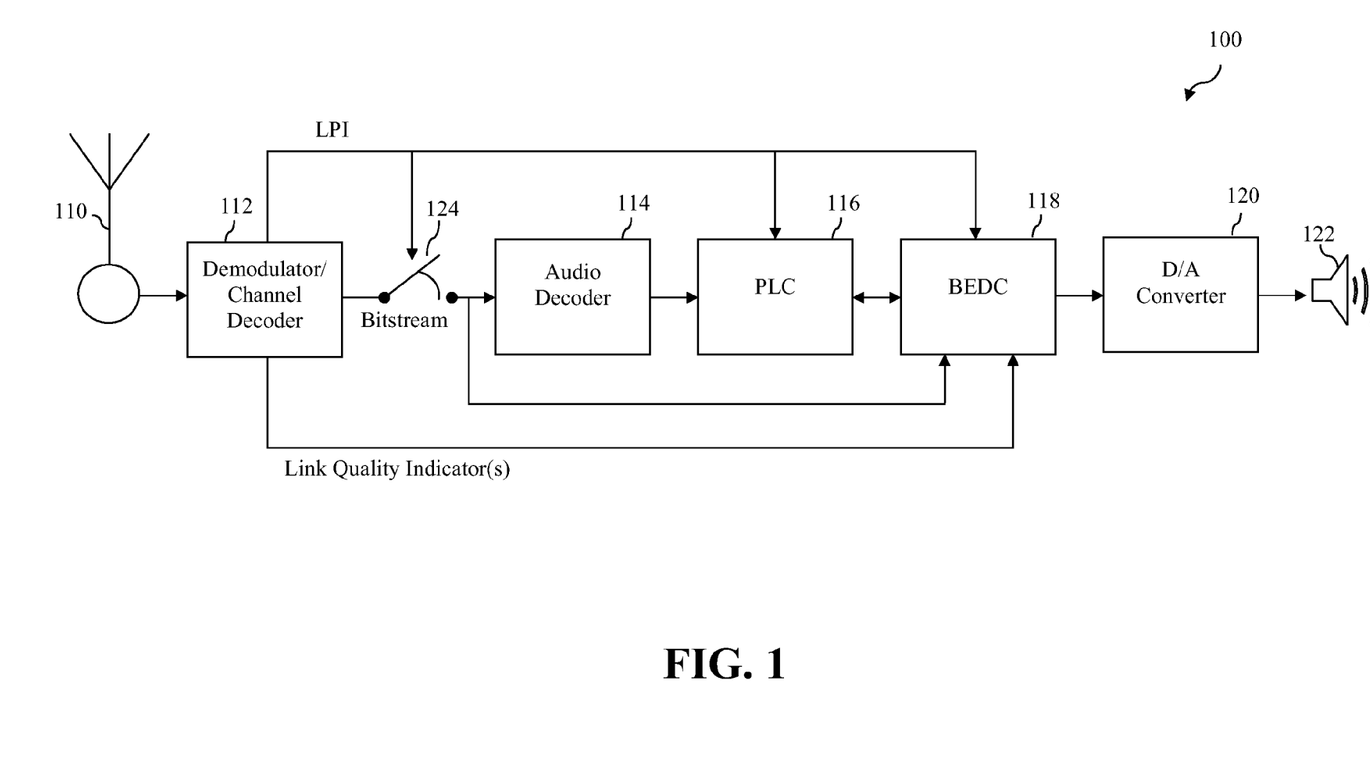
FIG. 1 is a block diagram of a first system for managing bit errors present in an encoded bit stream representative of a portion of an audio signal in accordance with an embodiment of the present invention.

FIG. 1 is a block diagram of an example system 100 that implements the aforementioned approach to bit error management. System 100 is intended to represent elements of a receiver in a wireless communications system, such as a Bluetooth® communications system. As shown in FIG. 1, system 100 includes an antenna 110, a demodulator/channel decoder 112, an audio decoder 114, a packet loss concealment (PLC) block 116, a bit error detection and concealment (BEDC) block 118, a digital-to-analog (D/A) converter 120 and a speaker 122.

Antenna 110 operates in a well-known manner to receive a modulated carrier signal over the air, wherein the signal is located in the 2.4 GHz spread-spectrum band utilized by Bluetooth® communications systems. Demodulator/channel decoder 112 is configured to demodulate the modulated carrier signal to generate a packet containing an encoded bit stream representative of a portion of an audio signal. For the purposes of this embodiment, it is assumed that the packet is an HV3 packet transmitted over a Bluetooth® SCO channel and that the encoded bit stream is carried in a user-data portion of the packet. The HV3 packet type and the SCO audio transport mechanism are fully defined in the Bluetooth® Core Specification (a current version of which is entitled BLUETOOTH SPECIFICATION Version 2.1+EDR, Jul. 26, 2007), the entirety of which is incorporated by reference herein.

Demodulator/channel decoder 112 is further configured to apply error detection and/or error correction techniques to the HV3 packet to determine whether or not the HV3 packet is suitable for subsequent decoding. The application of these techniques may include, for example and without limitation, determining if more than a predefined number of bits of a sync word portion of the HV3 packet are in error, analyzing header error check (HEC) bits in a header portion of the HV3 packet to determine if the packet header has been corrupted, and/or analyzing FEC information included in the HV3 packet header to detect and correct errors in the packet header. If demodulator/channel decoder 112 determines that the HV3 packet is not suitable for audio decoding, the packet is deemed lost and demodulation/channel decoder 112 asserts a lost packet indicator (LPI) signal, which is received by PLC block 116 and BEDC block 118. Otherwise, the packet is deemed received.

Note that because an HV3 packet provides no error correction or detection information corresponding to the user-data portion of the packet, demodulator/channel decoder 112 is not configured to consider the state of the user-data portion of the HV3 packet in determining whether or not the HV3 packet is suitable for subsequent decoding.

Demodulator/channel decoder 112 is still further configured to generate one or more link quality indicators and to provide the link quality indicator(s) to BEDC block 118. The link quality indicator(s) provide some indication of the quality of the wireless link over which the modulated carrier signal was received. The link quality indicator(s) may include, for example, a signal-to-noise ratio (SNR) or some other metric obtained during the demodulation of the modulated carrier signal.

If the HV3 packet is deemed lost by demodulator/channel decoder 112, then the encoded bit stream within the user-data portion of the HV3 packet will not be provided to audio decoder 114. In certain implementations, the operation of audio decoder 114 may be halted when this occurs. If the HV3 packet is deemed received, then the encoded bit stream is passed to audio decoder 114. In FIG. 1, the logic that determines whether or not to pass the encoded bit stream to audio decoder 114 based on whether the HV3 packet is deemed lost or received is symbolically represented by a switch 124 controlled by the LPI signal.

Audio decoder 114 is adapted to decompress the encoded bit stream (when available) received from demodulator/channel decoder 112 in accordance with an audio decoding technique to generate a series of digital audio samples. For example, audio decoder 114 may decompress the encoded bit stream in accordance with a CVSD audio decoding technique. Alternatively, audio decoder 114 may apply an A-law or L-law Pulse Code Modulation (PCM) audio decoding technique, or some other audio decoding technique. In an embodiment, the decoded digital audio samples produced by audio decoder 114 comprise a frame of PCM samples.

The output of audio decoder 114 is passed to PLC block 120. PLC block 120 is configured to monitor the LPI signal to determine whether or not a packet has been deemed lost by demodulator/channel decoder 112. If the LPI signal indicates that a packet has been lost, PLC block 120 is configured to perform operations to synthesize a series of digital audio samples to replace the digital audio samples that would have been produced by audio decoder 114 if the packet had not been lost and to pass the synthesized digital audio samples to BEDC block 118. A variety of PLC techniques are known in the art for performing this function. If the LPI signal indicates that a packet has been received, then PLC block 120 may or may not perform PLC operations depending upon signals received from BEDC 118 as will be described in more detail below.

BEDC block 118 is connected to PLC block 116 and is configured to receive the LPI signal and the link quality indicator(s) from demodulator/channel decoder 112, as well as the encoded bit stream (when available) from demodulator/channel decoder 112.

If the LPI signal indicates that a packet has been lost, BEDC block 118 will pass the synthesized digital audio samples produced by PLC block 116 responsive to the packet loss to D/A converter 120. D/A converter 120 is adapted to convert the synthesized digital audio samples into an analog audio signal. A speaker 122 comprising an electromechanical transducer is connected to D/A converter 120 and operates in a well-known manner to convert the analog audio signal into sound waves for perception by a user.

However, if the LPI signal indicates that a packet has been received, BEDC block 118 will analyze at least the decoded digital audio samples produced by audio decoder 114 (and passed to BEDC block 118 by PLC block 116) and/or the encoded bit stream produced by demodulator 112 to estimate a distribution, extent and/or location of bit errors in the encoded bit stream. BEDC block 118 may also consider the link quality indicator(s) received from demodulator/channel decoder 112 in performing this estimation.

BEDC block 118 is further configured to select an appropriate method for mitigating the effects of detected bit errors based on at least the estimated distribution, extent and/or location of bit errors in the encoded bit stream. For example, in an embodiment in which audio decoder 114 comprises a CVSD decoder, BEDC block 118 may be configured to invoke PLC block 116 to generate synthesized digital audio samples if the estimated distribution of bit errors in the encoded bit stream suggests that bursty bit errors are present. In this case, the synthesized digital audio samples produced by PLC block 116 may be less likely to produce an audible "click" when played back to a user than the decoded digital audio samples produced by audio decoder 114, since a CVSD decoder is not robust to bursty bit errors. In further accordance with this example, BEDC block 118 may be configured to utilize the decoded digital audio samples produced by audio decoder 114 if the estimated distribution of bit errors in the encoded bit stream suggests that only a few random bit errors are present, since a CVSD decoder is robust to such random bit errors. Consequently, the decoded digital audio samples produced by audio decoder 114 may provide a better quality audio output signal than synthesized digital audio samples produced by PLC block 116.

In addition to considering the estimated distribution of bit errors in the encoded bit stream in determining the appropriate mitigation method, BEDC block 118 may additionally or alternatively consider the estimated extent or amount of such bit errors as well as the estimated or likely location of such bit errors in the encoded bit stream. For example, it is anticipated that the distortion produced by a CVSD decoder will increase with the number of bit errors in a frame. Thus, in one embodiment, BEDC block 118 may consider the estimated number of bit errors in the encoded bit stream in determining whether to invoke PLC block 116 to generate synthesized digital audio samples or to utilize the decoded digital audio samples produced by audio decoder 114. In embodiments that use Sub-band Coding (SBC), bit error location is important since the bit error sensitivity varies due to the parametric nature of the codec. Thus, in an example embodiment in which audio decoder 114 comprises an SBC decoder, if BEDC block 118 determines based on the estimated location of the bit error(s) that relatively sensitive bits have been impacted, then BEDC block 118 will invoke PLC block 116 to generate synthesized digital audio samples. However, if BEDC block 118 determines that only relatively resilient bits have been impacted, BEDC block 118 will utilize the decoded digital audio samples produced by audio decoder 114.

BEDC block 118 may also consider the decoded digital audio samples produced by audio decoder 114, the encoded bit stream produced by demodulator 112, and/or the link quality indicator(s) received from demodulator/channel decoder 112 in selecting the appropriate method for mitigating the effects of detected bit errors. Still further, BEDC block 118 may analyze previously-received portions of the audio signal to determine whether or not the portion of the audio signal represented by the encoded bit stream is a portion that can be replaced with PLC without significant loss of quality. For example, PLC based on extrapolation of the previously-received audio waveform is likely to perform well during stationary speech segments but is unlikely to perform well during a transition period. BEDC block 118 can thus use the character of the audio signal to select the appropriate mitigation approach.

Depending upon the mitigation approach selected by BEDC block 118 for a particular received packet, BEDC block 118 may either pass a series of digital audio samples produced by audio decoder 114 or a series of synthesized digital audio samples produced by PLC block 116 to D/A converter 120. D/A converter 120 is adapted to convert the digital audio samples output by BEDC block 118 into an analog form suitable for playback by speaker 122.

In a further embodiment, BEDC block 118 may estimate the position at which bit errors begin in the encoded bit stream and then utilize a combination of decoding and PLC to produce digital audio samples. For example, BEDC block 118 may cause the portion of the encoded bit stream that precedes the estimated position at which bit errors begin to be decoded by audio decoder 114 while causing digital audio samples corresponding to the remaining portion of the encoded bit stream to be synthesized using PLC block 116. BEDC block 118 may also estimate the position at which bit errors end in the encoded bit stream and cause at least the portion of the encoded bit stream that follows the estimated position at which bit errors end to be decoded by audio decoder 114.

In general, the operation of BEDC block 118 as described above ensures that the best available approach is adopted for handling bit errors in the encoded bit stream carried by a received HV3 packet. Of course, depending upon the bit error detection method implemented by BEDC block 118, it is possible that BEDC block 118 may occasionally incorrectly estimate the distribution, extent and/or location of bit errors in the encoded bit stream such that the best available approach is not selected. Nevertheless, it is anticipated that the foregoing approach will provide a better quality audio output than conventional systems in which the determination of whether to apply PLC or not is driven entirely by whether or not the header of the HV3 packet has passed or failed an error check.

Figure 2:
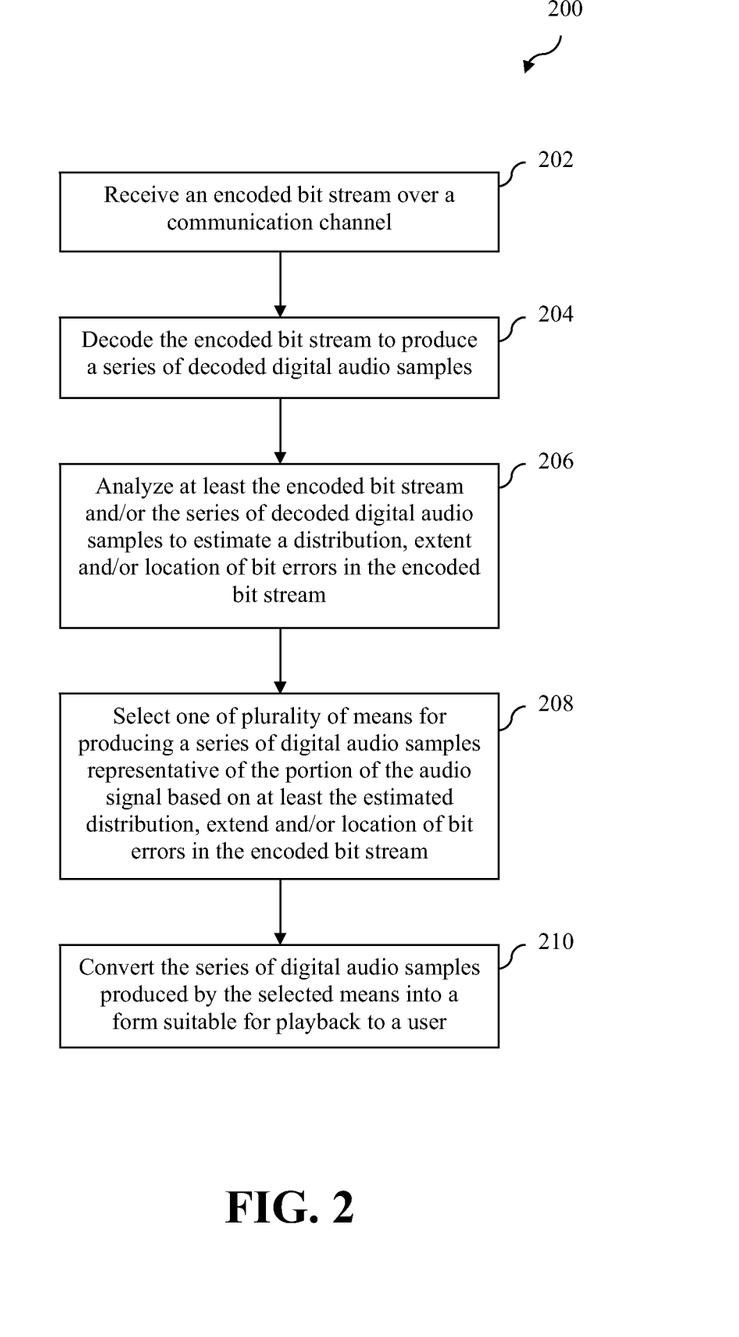
FIG. 2 depicts a flowchart of a first method for managing bit errors present in an encoded bit stream that is representative of a portion of an audio signal in accordance with an embodiment of the present invention.

The foregoing approach to bit error management will now be further described in reference to flowchart 200 of FIG. 2. In particular, flowchart 200 depicts a method for managing bit errors present in an encoded bit stream that is representative of a portion of an audio signal in accordance with an embodiment of the present invention. The method of flowchart 200 will now be described with continued reference to system 100 of FIG. 1. However, the method is not limited to that implementation.

As shown in FIG. 2, the method of flowchart 200 begins at step 202 in which demodulator/channel decoder 112 receives an encoded bit stream over a communication channel. In an embodiment, demodulator/channel decoder 112 receives the encoded bit stream as part of an HV3 packet transmitted over a Bluetooth® SCO channel.

At step 204, audio decoder 114 decodes the encoded bit stream to produce a series of decoded digital audio samples. In an embodiment, this step includes decoding the encoded bit stream in accordance with a CVSD decoding technique. However, the present invention is not so limited and other decoding techniques may be used during this step including but not limited to A-law or u-law PCM decoding, SBC decoding, and Code Excited Linear Prediction (CELP) based decoding.

At step 206, BEDC block 118 analyzes at least the encoded bit stream and/or the series of decoded digital audio samples to estimate a distribution, extent and/or location of bit errors in the encoded bit stream. Estimating the distribution of bit errors in the encoded bit stream may comprise estimating whether bit errors present in the encoded bit stream are random or bursty in nature. Estimating the extent of bit errors in the bit stream may comprise estimating a number of bit errors in the encoded bit stream. In one embodiment, the method of flowchart 200 further includes the generation of one or more link quality indicators by demodulator/channel decoder 112, wherein the link quality indicator(s) are indicative of the quality of a wireless link over which the communication channel was established. In accordance with such an embodiment, BEDC block 118 may use the link quality indicator(s) to estimate the distribution, extent and/or location of bit errors in the encoded bit stream and/or to select the appropriate means for mitigating the effects of such bit errors.

At step 208, BEDC block 118 selects one of a plurality of means for producing a series of digital audio samples representative of the portion of the audio signal based on at least the estimated distribution, extent and/or location of bit errors in the encoded bit stream. This step may include analyzing one or more of the encoded bit stream, the series of decoded digital audio samples produced by audio decoder 114 through decompression of the encoded bit stream, one or more link quality indicators generated by demodulator/channel decoder 112, and/or one or more portions of the previously-received audio signal to select one of the plurality of means for producing the series of digital audio samples.

In one embodiment, this step may comprise selecting PLC block 116 to produce a series of synthesized digital audio samples representative of the portion of the audio signal or selecting audio decoder 114 that decoded the encoded bit stream to produce the series of decoded digital audio samples. In a further embodiment, this step may comprise selecting audio decoder 114 to decode a first portion of the encoded bit stream to produce a first portion of the series of digital audio samples and selecting PLC block 116 to produce a second portion of the series of digital audio samples.

At step 210, D/A converter 120 converts the series of digital audio samples produced by the selected means into a form suitable for playback to a user via speaker 122.

C. Management of Bit Errors for eSCO Channels

An approach to bit error management similar to that described in Section B above can also be used for Bluetooth® eSCO channels in accordance with an alternate embodiment of the present invention. As discussed in the Background Section above, eSCO channels support both retransmissions and cyclic redundancy check (CRC) protection on the user-data portion of the packet that includes the encoded bit stream. The CRC data associated with the user-data portion provides additional knowledge that can be exploited by the bit error detection and concealment block to mitigate the impact of bit errors. For example, if a CRC check on the user data passes, then there are no bit errors in the encoded bit stream and the bit error detection and concealment block can simply allow the encoded bit stream to be decoded by the audio decoder. In this case, the possibility that the bit error detection and concealment block will incorrectly select the wrong mitigation approach is removed.

Figure 3:
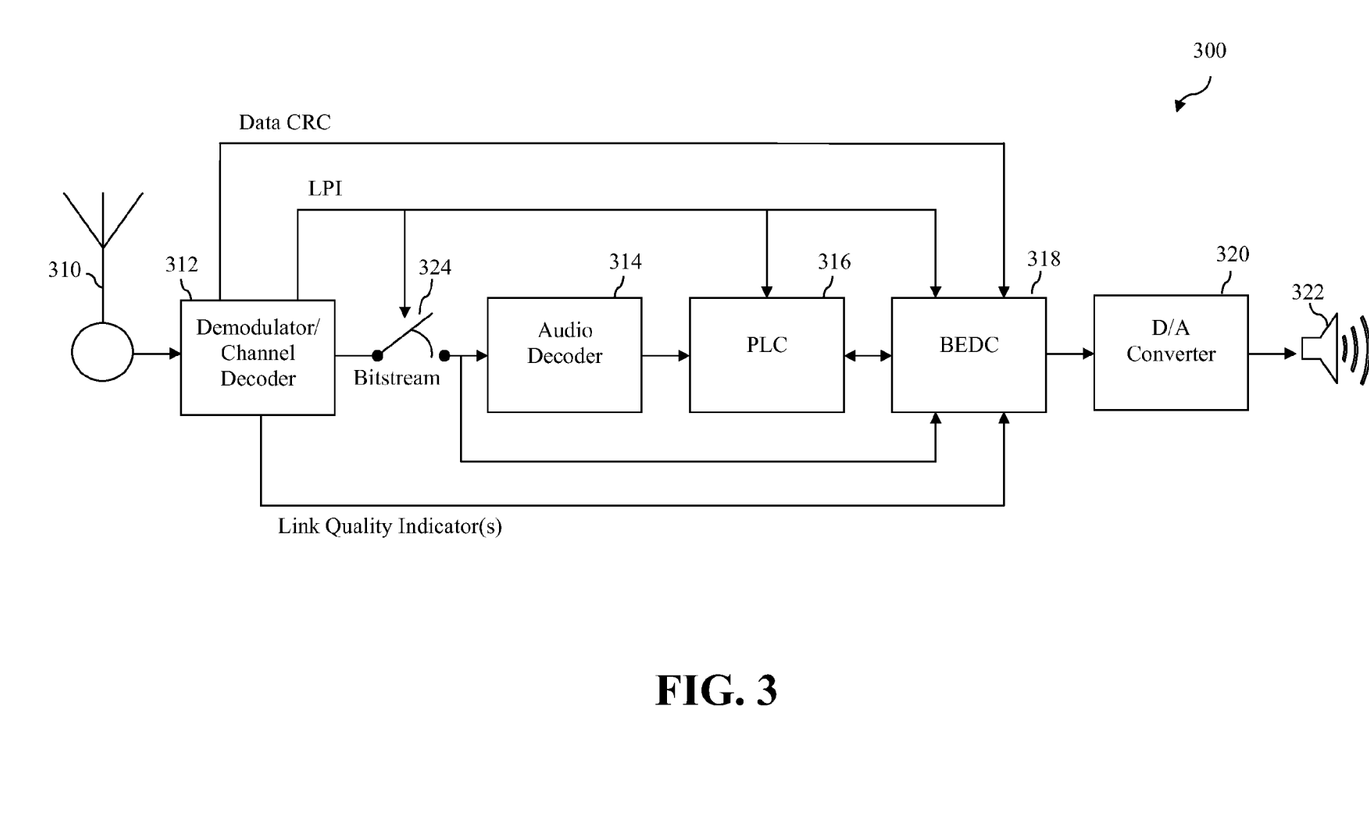
FIG. 3 is a block diagram of a second system for managing bit errors present in an encoded bit stream representative of a portion of an audio signal in accordance with an embodiment of the present invention.

FIG. 3 is a block diagram of an example system 300 that implements the aforementioned approach to bit error management. System 300 is intended to represent elements of a receiver in a wireless communications system, such as a Bluetooth® communications system. As shown in FIG. 3, system 300 includes an antenna 310, a demodulator/channel decoder 312, an audio decoder 314, a PLC block 316, a bit error detection and concealment (BEDC) block 318, a digital-to-analog (D/A) converter 320 and a speaker 322.

Antenna 310 operates in a well-known manner to receive a modulated carrier signal over the air, wherein the signal is located in the 2.4 GHz spread-spectrum band utilized by Bluetooth® communications systems. Demodulator/channel decoder 312 is configured to demodulate the modulated carrier signal to generate a packet containing an encoded bit stream representative of a portion of an audio signal. For the purposes of this embodiment, it is assumed that the packet is an EV3, EV4 or EV5 packet transmitted over a Bluetooth® eSCO channel and that the encoded bit stream is carried in a user-data portion of the packet. The EV3, EV4 and EV5 packet types and the eSCO audio transport mechanism are fully defined in the Bluetooth® Core Specification (a current version of which is entitled BLUETOOTH SPECIFICATION Version 2.1+EDR, Jul. 26, 2007), the entirety of which has been incorporated by reference herein.

Demodulator/channel decoder 312 is further configured to apply error detection and/or error correction techniques to the packet to determine whether or not the packet is suitable for subsequent decoding. The application of these techniques may include, for example and without limitation, determining if more than a predefined number of bits of a sync word portion of the packet are in error, analyzing header error check (HEC) bits in a header portion of the packet to determine if the packet header has been corrupted, analyzing FEC information included in the packet header to detect and correct errors in the packet header, and/or analyzing CRC information included within a user-data portion of the packet to determine if the user data has been corrupted. If demodulator/channel decoder 312 determines that the packet is not suitable for audio decoding, then demodulation/channel decoder 312 may cause a retransmission request to be sent to the entity that transmitted the packet, thereby causing another copy of the packet to be sent to the receiver. If, after a limited number of retransmissions, a copy of the packet has not been received that is suitable for audio decoding by demodulation/channel decoder 312, then the packet is deemed lost and demodulation/channel decoder 312 asserts a lost packet indicator (LPI) signal, which is received by PLC block 316 and BEDC block 318. Otherwise, the packet is deemed received. Demodulator/channel decoder 312 also provides a data CRC indicator that indicates whether or not the user-data portion of the packet has passed a CRC check to PLC block 316 and BEDC block 318.

Demodulator/channel decoder 312 is still further configured to generate one or more link quality indicators and to provide the link quality indicator(s) to BEDC block 318. The link quality indicator(s) provide some indication of the quality of the wireless link over which the modulated carrier signal was received. The link quality indicator(s) may include, for example, an SNR or some other metric obtained during the demodulation of the modulated carrier signal.

If the packet is deemed lost by demodulator/channel decoder 312, then the encoded bit stream within the user-data portion of the packet will not be provided to audio decoder 314. In certain implementations, the operation of audio decoder 314 may be halted when this occurs. If the packet is deemed received, then the encoded bit stream is passed to audio decoder 314. In FIG. 3, the logic that determines whether or not to pass the encoded bit stream to audio decoder 314 based on whether the packet is deemed lost or received is symbolically represented by a switch 324 controlled by the LPI signal.

Audio decoder 314 is adapted to decompress the encoded bit stream (when available) received from demodulator/channel decoder 312 in accordance with an audio decoding technique to generate a series of digital audio samples. For example, audio decoder 314 may decompress the encoded bit stream in accordance with a CVSD audio decoding technique. Alternatively, audio decoder 314 may apply an A-law or L-law PCM audio decoding technique, or some other audio decoding technique. In an embodiment, the decoded digital audio samples produced by audio decoder 314 comprise a frame of PCM samples.

The output of audio decoder 314 is passed to PLC block 320. PLC block 320 is configured to monitor the LPI signal to determine whether or not a packet has been deemed lost by demodulator/channel decoder 312. If the LPI signal indicates that a packet has been lost, PLC block 320 is configured to perform operations to synthesize a series of digital audio samples to replace the digital audio samples that would have been produced by audio decoder 314 if the packet had not been lost and to pass the synthesized digital audio samples to BEDC block 318. A variety of PLC techniques are known in the art for performing this function. If the LPI signal indicates that a packet has been received, then PLC block 320 may or may not perform PLC operations depending upon signals received from BEDC 318 as will be described in more detail below.

BEDC block 318 is connected to PLC block 316 and is configured to receive the LPI signal, the data CRC signal and the link quality indicator(s) from demodulator/channel decoder 312, as well as the encoded bit stream (when available) from demodulator/channel decoder 312.

If the LPI signal indicates that a packet has been lost, BEDC block 318 will pass the synthesized digital audio samples produced by PLC block 316 responsive to the packet loss to D/A converter 320. D/A converter 320 is adapted to convert the synthesized digital audio samples into an analog audio signal. A speaker 322 comprising an electromechanical transducer is connected to D/A converter 320 and operates in a well-known manner to convert the analog audio signal into sound waves for perception by a user.

However, if the LPI signal indicates that a packet has been received, then BEDC block 318 will analyze the data CRC indicator to determine whether bit errors are present in the encoded bit stream. If the data CRC indicator indicates that there are no bit errors present in the encoded bit stream, then BEDC block 318 will pass the series of digital audio samples produced by audio decoder 314 to D/A converter 320, D/A converter 320 will convert the decoded digital audio samples into an analog audio signal, and speaker 322 will operate to convert the analog audio signal into sound waves for perception by a user.

However, if the data CRC indicator indicates that there are bit errors present in the encoded bit stream, then BEDC block 318 will analyze at least the decoded digital audio samples produced by audio decoder 314 (and passed to BEDC block 318 by PLC block 316) and/or the encoded bit stream produced by demodulator 112 to estimate a distribution, extent and/or location of the bit errors in the encoded bit stream. BEDC block 318 will further select an appropriate method for mitigating the effects of the bit errors based on at least the estimated distribution, extend and/or location of the bit errors in the encoded bit stream.

BEDC block 318 may also analyze the decoded digital audio samples produced by audio decoder 314 (and passed to BEDC block 318 by PLC block 316), the encoded bit stream produced by demodulator/channel decoder 312 and/or the link quality indicator(s) produced by demodulator/channel decoder 312 in selecting the appropriate method. Still further, BEDC block 318 may analyze previously-received portions of the audio signal to determine whether or not the portion of the audio signal represented by the encoded bit stream is a portion that can be replaced with PLC without significant loss of quality. BEDC block 318 can thus use the character of the audio signal to select the appropriate mitigation approach. The selected methods may include, but are not limited to, invoking PLC block 316 to generate synthesized digital audio samples or utilizing the decoded digital audio samples produced by audio decoder 314.

Depending upon the mitigation approach selected by BEDC block 318 for a particular received packet, BEDC block 318 may either pass a series of digital audio samples produced by audio decoder 314 or a series of synthesized digital audio samples produced by PLC block 316 to D/A converter 320. D/A converter 320 is adapted to convert the digital audio samples output by BEC block 318 into an analog form suitable for playback by speaker 322. In a further embodiment, BEDC block 318 may utilize a combination of decoding and PLC to produce a series of digital audio samples as discussed in the preceding section.

Figure 4:
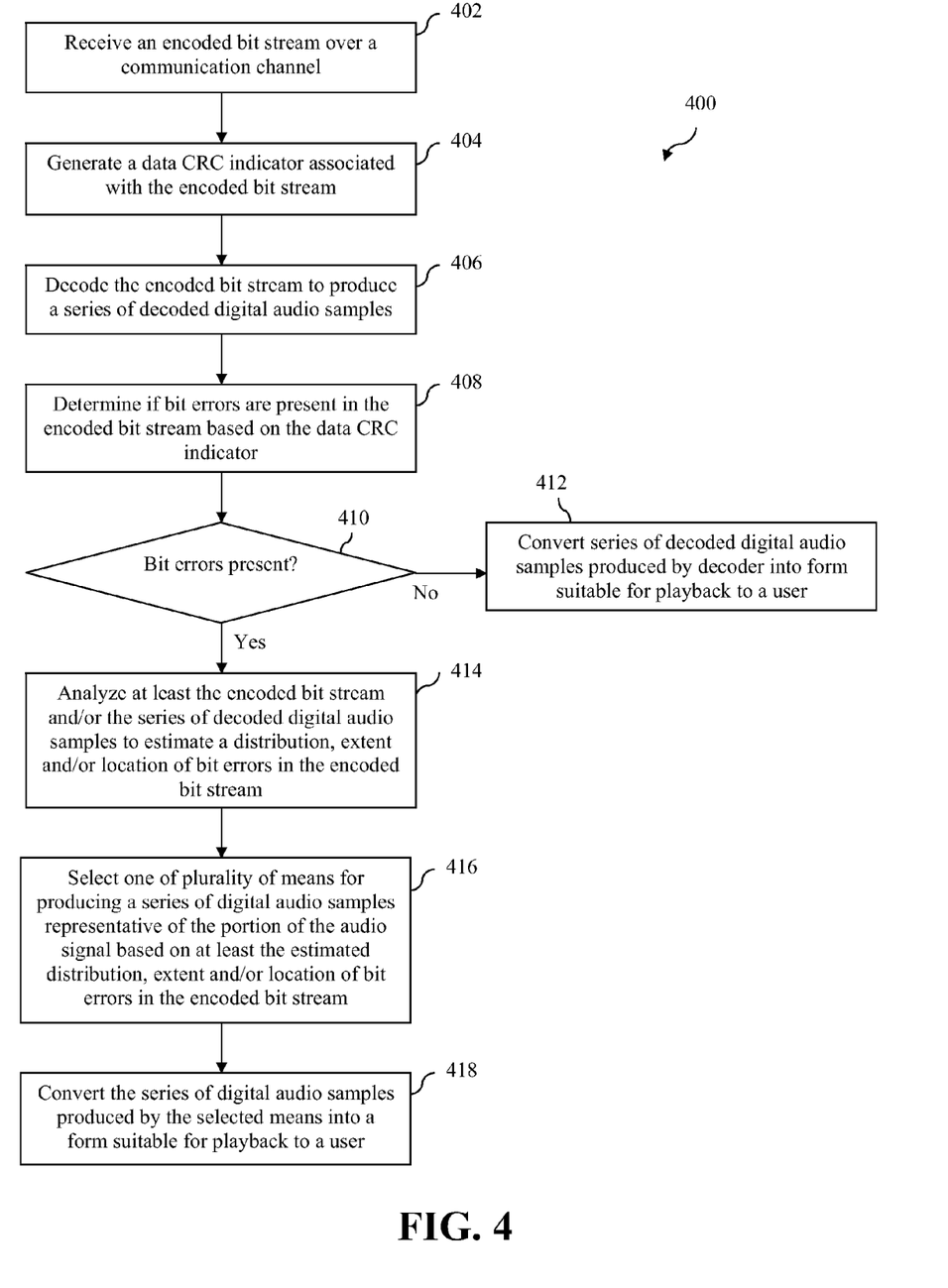
FIG. 4 depicts a flowchart of a second method for managing bit errors present in an encoded bit stream that is representative of a portion of an audio signal in accordance with an embodiment of the present invention.

The foregoing approach to bit error management will now be further described in reference to flowchart 400 of FIG. 4. In particular, flowchart 400 depicts a method for managing bit errors present in an encoded bit stream that is representative of a portion of an audio signal in accordance with an embodiment of the present invention. The method of flowchart 400 will now be described with continued reference to system 300 of FIG. 3. However, the method is not limited to that implementation.

As shown in FIG. 4, the method of flowchart 400 begins at step 402 in which demodulator/channel decoder 312 receives an encoded bit stream over a communication channel. In an embodiment, demodulator/channel decoder 312 receives the encoded bit stream as part of an EV3, EV4 or EV5 packet transmitted over a Bluetooth® eSCO channel.

At step 404, demodulator/channel decoder 312 generates a data CRC indicator associated with the encoded bit stream. In an embodiment, demodulator/channel decoder 312 generates the data CRC indicator by analyzing CRC information provided along with the encoded bit stream in the user-data portion of an EV3, EV4 or EV5 packet.

At step 406, audio decoder 314 decodes the encoded bit stream to produce a series of decoded digital audio samples. In an embodiment, this step includes decoding the encoded bit stream in accordance with a CVSD decoding technique. However, the present invention is not so limited and other decoding techniques may be used during this step including but not limited to A-law or u-law PCM decoding, SBC decoding, and CELP based decoding.

At step 408, BEDC block 318 determines if bit errors are present in the encoded bit stream based on the data CRC indicator. As shown at decision step 410, if BEDC block 318 determines that there are no bit errors present in the encoded bit stream, then control flows to step 412. At step 412, BEDC block 318 causes the decoded digital audio samples produced by audio decoder 314 to be provided to D/A converter 320 for conversion into a form suitable for playback to a user via speaker 322.

However, as further shown at decision step 408, if BEDC block 318 determines that there are bit errors present in the encoded bit stream, then control flows to step 414. At step 414, BEDC block 318 analyzes at least the encoded bit stream and/or the series of decoded digital audio samples to estimate a distribution, extent and/or location of bit errors in the encoded bit stream. Estimating the distribution of bit errors in the encoded bit stream may comprise estimating whether bit errors present in the encoded bit stream are random or bursty in nature. Estimating the extent of bit errors in the bit stream may comprise estimating a number of bit errors in the encoded bit stream.

In one embodiment, the method of flowchart 400 further includes the generation of one or more link quality indicators by demodulator/channel decoder 312, wherein the link quality indicator(s) are indicative of the quality of a wireless link over which the communication channel was established. In accordance with such an embodiment, BEDC block 318 may use the link quality indicator(s) to estimate the distribution, extent and/or location of bit errors in the encoded bit stream and/or to select the appropriate means for mitigating the effects of such bit errors.

At step 416, BEDC block 318 selects one of a plurality of means for producing a series of digital audio samples representative of the portion of the audio signal represented by the encoded bit stream based on at least the estimated distribution, extent and/or location of bit errors in the encoded bit stream. This step may include analyzing one or more of the encoded bit stream, the series of decoded digital audio samples produced by audio decoder 314 through decompression of the encoded bit stream, one or more link quality indicators generated by demodulator/channel decoder 312, and/or one or more portions of the previously-received audio signal to select one of the plurality of means for producing the series of digital audio samples.

In one embodiment, step 416 may comprise selecting PLC block 316 to produce a series of synthesized digital audio samples representative of the portion of the audio signal or selecting audio decoder 314 to decode the encoded bit stream to produce the series of decoded digital audio samples. In a further embodiment, this step may comprise selecting audio decoder 314 to decode a first portion of the encoded bit stream to produce a first portion of the series of digital audio samples and selecting PLC block 316 to produce a second portion of the series of digital audio samples.

At step 418, D/A converter 320 converts the series of digital audio samples produced by the selected means into a form suitable for playback to a user via speaker 322.

D. Performance of Example Implementations

Figure 5:
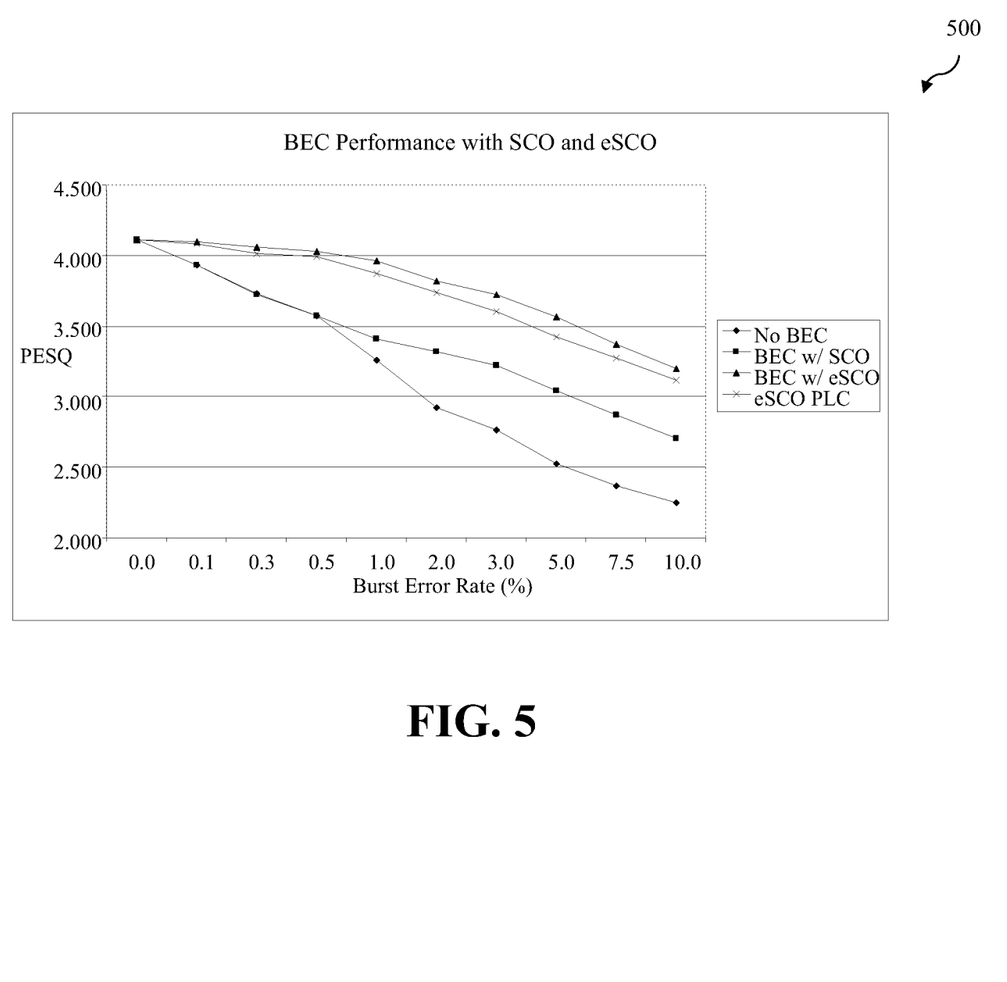
FIG. 5 is a graph that illustrates the performance of bit error management methods in accordance with certain implementations of the present invention for bursty bit errors.

The performance of bit error management methods in accordance with certain implementations of the present invention that use CVSD decoding in the presence of bursty bit errors is shown in graph 500 of FIG. 5. As can be seen, an improvement of approximately 0.5 PESQ (Perceptual Evaluation of Speech Quality) is obtainable with SCO channels and HV3 packets between using no concealment (denoted "No BEC") and an implementation of the present invention described in Section B above (denoted "BEC w/SCO"). A further 0.5 PESQ improvement is obtained using the additional knowledge provided by eSCO channels with an implementation of the present invention as described in Section C above (denoted "BEC w/eSCO") for a total improvement of about 1.0 PESQ. The method of simply declaring packet loss when the data CRC fails is also shown ("eSCO PLC"). It also shows drastic improvement, though not as good as the embodiment of the present invention denoted BEC with eSCO.

Figure 6:
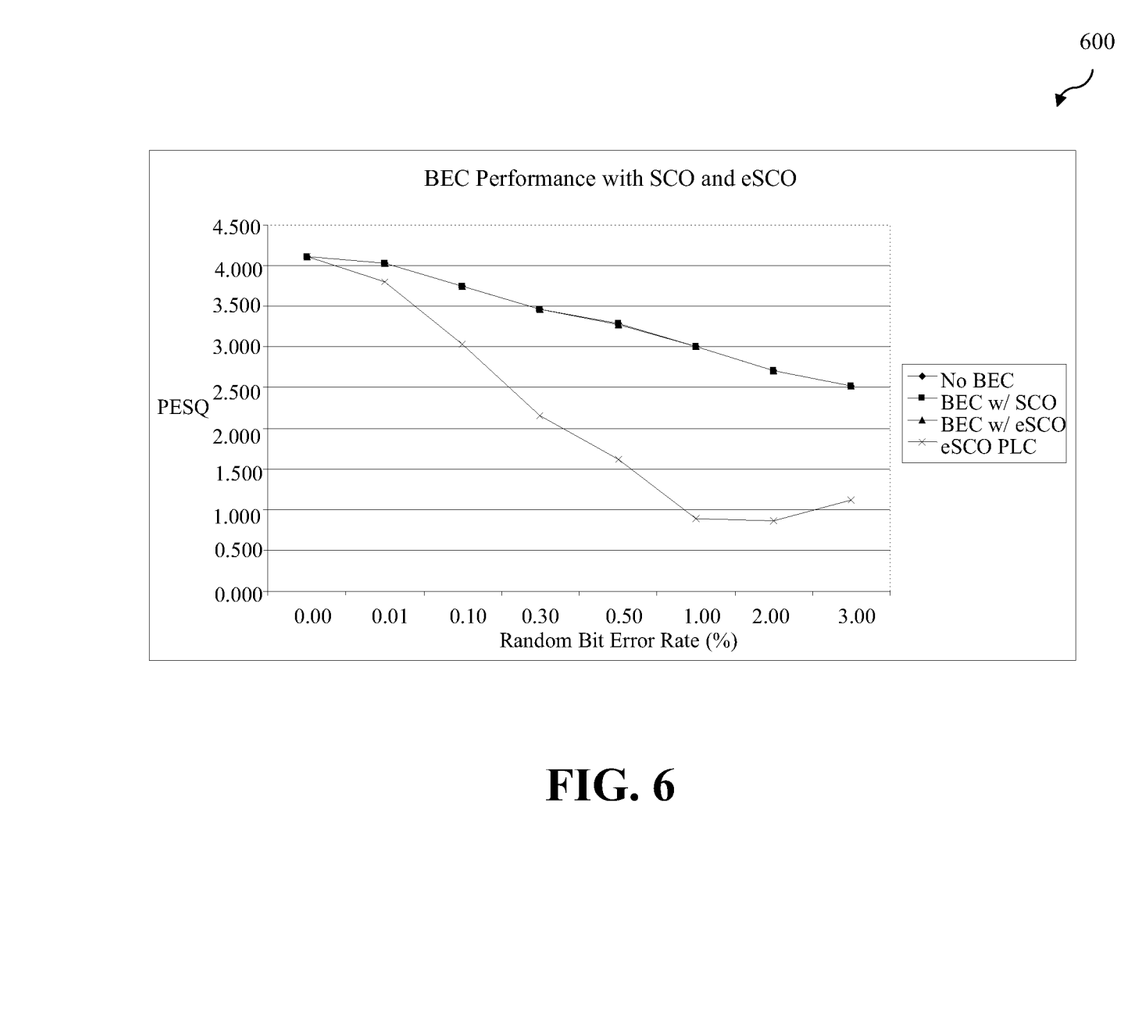
FIG. 6 is a graph that illustrates the performance of bit error management methods in accordance with certain implementations of the present invention for random bit errors.

Graph 600 of FIG. 6 shows the concealment performance for random bit errors. It is critical to note that the systems denoted "No BEC", "BEC w/SCO", and "BEC w/eSCO" provide essentially equivalent performance. This is to be expected since CVSD provides good protection against random bit errors and an implementation of the present invention is designed to conceal clicks caused by bit-errors. However, the technique of declaring packet loss for all CRC failures (header and/or data CRC) shows a very sharp degradation curve, verifying the statement that for random bit errors, CVSD provides far better concealment than throwing out the complete packet and performing PLC. This graph effectively eliminates "eSCO PLC" as a plausible method.

E. Example Computer System Implementation

Depending upon the implementation, various elements of systems 100 and 300 (described above in reference to FIGS. 1 and 3, respectively) as well as various steps of flowcharts 200 and 400 (described above in reference to FIGS. 1 and 4, respectively) may be implemented in hardware using analog and/or digital circuits, in software, through the execution of instructions by one or more general purpose or special-purpose processors, or as a combination of hardware and software. An example of a computer system 700 that may be used to execute certain software-implemented features of these systems and methods is depicted in FIG. 7.

Figure 7:
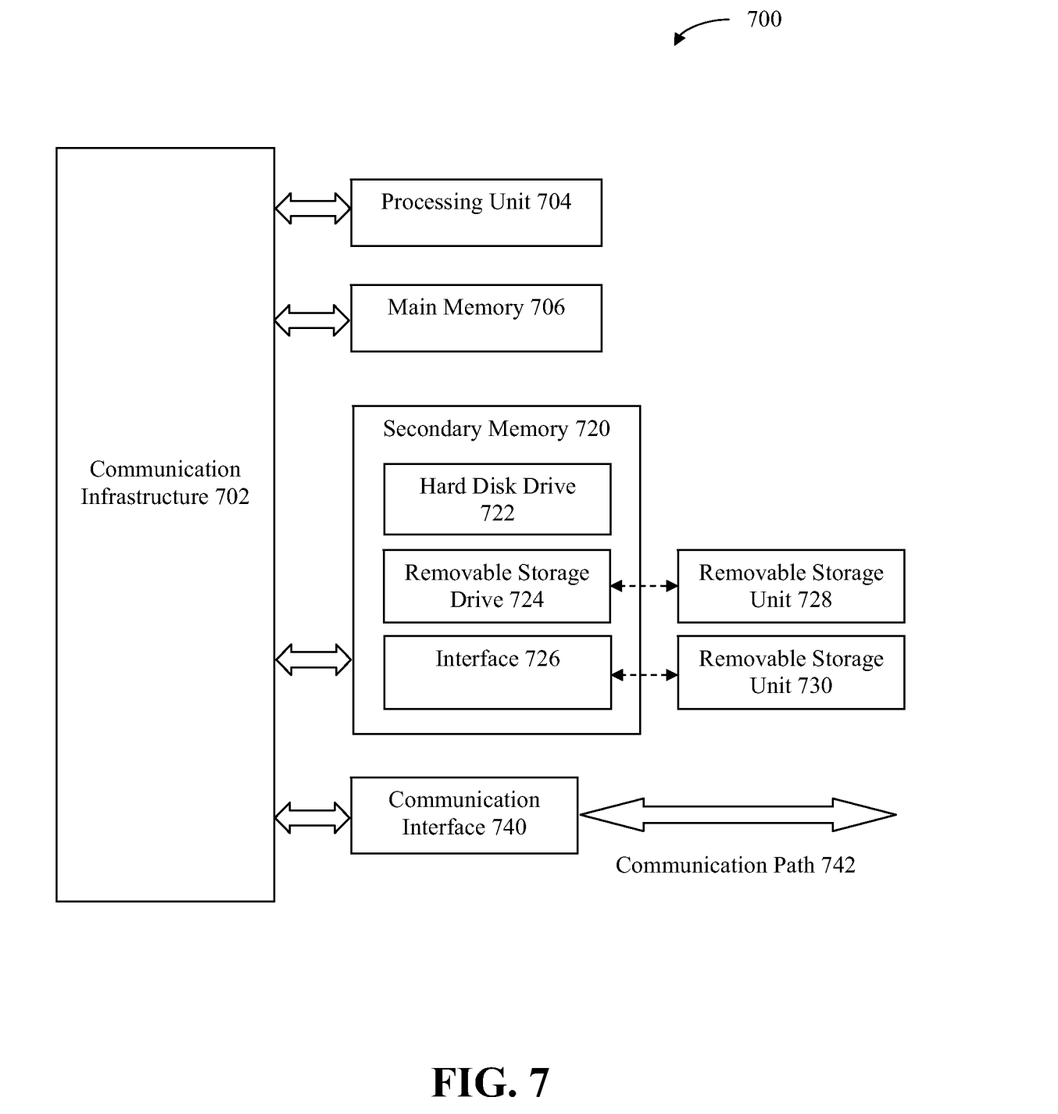
FIG. 7 depicts a computer system that may be used to implement aspects of the present invention.

As shown in FIG. 7, computer system 700 includes a processing unit 704 that includes one or more processors. Processor unit 704 is connected to a communication infrastructure 702, which may comprise, for example, a bus or a network.

Computer system 700 also includes a main memory 706, preferably random access memory (RAM), and may also include a secondary memory 720. Secondary memory 720 may include, for example, a hard disk drive 722, a removable storage drive 724, and/or a memory stick. Removable storage drive 724 may comprise a floppy disk drive, a magnetic tape drive, an optical disk drive, a flash memory, or the like. Removable storage drive 724 reads from and/or writes to a removable storage unit 728 in a well-known manner. Removable storage unit 728 may comprise a floppy disk, magnetic tape, optical disk, or the like, which is read by and written to by removable storage drive 724. As will be appreciated by persons skilled in the relevant art(s), removable storage unit 728 includes a computer usable storage medium having stored therein computer software and/or data.

In alternative implementations, secondary memory 720 may include other similar means for allowing computer programs or other instructions to be loaded into computer system 700. Such means may include, for example, a removable storage unit 730 and an interface 726. Examples of such means may include a program cartridge and cartridge interface (such as that found in video game devices), a removable memory chip (such as an EPROM, or PROM) and associated socket, and other removable storage units 730 and interfaces 726 which allow software and data to be transferred from the removable storage unit 730 to computer system 700.

Computer system 700 may also include a communication interface 740. Communication interface 740 allows software and data to be transferred between computer system 700 and external devices. Examples of communication interface 740 may include a modem, a network interface (such as an Ethernet card), a communications port, a PCMCIA slot and card, or the like. Software and data transferred via communication interface 740 are in the form of signals which may be electronic, electromagnetic, optical, or other signals capable of being received by communication interface 740. These signals are provided to communication interface 740 via a communication path 742. Communications path 742 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 728, removable storage unit 730 and a hard disk installed in hard disk drive 722. Computer program medium and computer readable medium can also refer to memories, such as main memory 706 and secondary memory 720, which can be semiconductor devices (e.g., DRAMs, etc.). These computer program products are means for providing software to computer system 700.

Computer programs (also called computer control logic, programming logic, or logic) are stored in main memory 706 and/or secondary memory 720. Computer programs may also be received via communication interface 740. Such computer programs, when executed, enable computer system 700 to implement features of the present invention as discussed herein. Accordingly, such computer programs represent controllers of computer system 700. Where the invention is implemented using software, the software may be stored in a computer program product and loaded into computer system 700 using removable storage drive 724, interface 726, or communication interface 740.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

F. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for managing bit-errors present in an audio-encoded bit stream representative of a portion of an audio signal, comprising:
   receiving the audio-encoded bit stream over a communication channel;
   decoding the encoded bit stream to produce a series of decoded digital audio samples;
   analyzing both the audio-encoded bit stream and the series of decoded digital audio samples to estimate at least one of a distribution, extent and location of bit errors in the audio-encoded bit stream;
   when bit errors are detected in the audio-encoded bit stream, selecting a first one of a plurality of means for producing a series of digital audio samples representative of the portion of the audio signal based on determining that there is at least one of a first estimated distribution, extent and location of bit errors in the audio-encoded bit stream and selecting a second one of the plurality of means for producing the series of digital audio samples representative of the portion of the audio signal based on determining that there is at least one of a second estimated distribution, extent and location of bit errors in the audio-encoded bit stream; and
   converting the series of digital audio samples produced by the selected means into a form suitable for playback to a user.

2. The method of claim 1, wherein receiving the audio-encoded bit stream over the communication channel comprises:
   receiving the audio-encoded bit stream as part of a packet transmitted over a Synchronous Connection-Oriented (SCO) communication channel.

3. The method of claim 1, further comprising:
   generating one or more indicators that indicate a quality of a wireless link over which the communication channel was established;
   wherein the selecting step comprises selecting the first or second one of the plurality of means for producing the series of digital audio samples representative of the portion of the audio signal based on determining that there is at least one of the first or second estimated distribution, extent and location of the bit errors and the indicator(s).

4. The method of claim 1, wherein the selecting step comprises selecting the first or second one of the plurality of means for producing the series of digital audio samples representative of the portion of the audio signal based on determining that there is at least one of the first or second estimated distribution, extent and location of the bit errors and an analysis of one or more previously-received portions of the audio signal.

5. The method of claim 1, wherein selecting the first or second one of the plurality of means for producing the series of digital audio samples representative of the portion of the audio signal comprises:
   selecting a packet loss concealment (PLC) block to produce the series of digital audio samples.

6. The method of claim 1, wherein selecting the first or second one of the plurality of means for producing the series of digital audio samples representative of the portion of the audio signal comprises:
   selecting an audio decoder that decodes the audio-encoded bit stream to produce the series of digital audio samples.

7. The method of claim 6, wherein selecting the audio decoder that decodes the audio-encoded bit stream to produce the series of digital audio samples comprises:
   selecting an audio decoders that decodes the audio-encoded bit stream in accordance with a Continuously Variable Slope Delta Modulation (CVSD) decoding technique.

8. The method of claim 1, wherein selecting the first or second one of the plurality of means for producing the series of digital audio samples representative of the portion of the audio signal comprises:
   selecting an audio decoder to decode a first portion of the audio-encoded bit stream to produce a first portion of the series of digital audio samples; and
   selecting a packet loss concealment (PLC) block to produce a second portion of the series of digital audio samples.

9. A system, comprising:
   a demodulator/channel decoder configured to receive a modulated carrier signal from an antenna and to generate an audio-encoded bit stream representative of a portion of an audio signal therefrom;
   an audio decoder configured to decode the encoded bit stream to produce a series of decoded digital audio samples;
   a bit error detection and concealment block configured
      to analyze both the audio-encoded bit stream and the series of decoded digital audio samples to estimate at least one of a distribution, extent and location of bit errors in the audio-encoded bit stream,
      to select a first one of a plurality of means for producing a series of digital audio samples representative of the portion of the audio signal based on determining that there is at least one of a first estimated distribution, extent and location of bit errors in the audio-encoded bit stream; and
      to select a second one of the plurality of means for producing the series of digital audio samples representative of the portion of the audio signal based on determining that there is at least one of a second estimated distribution, extent and location of bit errors in the audio-encoded bit stream; and
   a digital to analog converter configured to convert the series of digital audio samples produced by the selected means into an analog audio signal suitable for playback to a user.

10. The system of claim 9, wherein the modulated carrier signal is received over a Synchronous Connection-Oriented (SCO) communication channel.

11. The system of claim 9, wherein the demodulator/channel decoder is further configured to generate one or more indicators that indicate a quality of a wireless link over which the communication channel was established; and
   wherein the bit error detection and concealment block is configured to select the first or second one of the plurality of means for producing the series of digital audio samples representative of the portion of the audio signal based on determining that there is at least one of the first or second estimated distribution, extent and location of bit errors in the audio-encoded bit stream and the indicator(s).

12. The system of claim 9, wherein the bit error detection and concealment block is configured to select the first or second one of the plurality of means for producing the series of digital audio samples representative of the portion of the audio signal based on determining that there is at least one of the first or second estimated distribution, extent and location of bit errors in the audio-encoded bit stream and an analysis of one or more of the previously-received portions of the audio signal.

13. The system of claim 9, wherein the plurality of means for producing the series of digital audio samples representative of the portion of the audio signal comprises:
    a packet loss concealment (PLC) block configured to produce a series of synthesized digital audio samples representative of the portion of the audio signal.

14. The system of claim 9, wherein the plurality of means for producing the series of digital audio samples representative of the portion of the audio signal comprises:
    an audio decoder.

15. The system of claim 14, wherein the audio decoder comprises a Continuously Variable Slope Delta Modulation (CVSD) decoder.

16. A method for managing bit-errors present in an audio-encoded bit stream representative of a portion of an audio signal, comprising:
    receiving the audio-encoded bit stream over a communication channel;
    generating a data cyclic redundancy check (CRC) indicator associated with the audio-encoded bit stream;
    decoding the encoded bit stream to produce a series of decoded digital audio samples;
    determining if bit errors are present in the audio-encoded bit stream based on the data CRC indicator; and
    responsive to determining that bit errors are present in the audio-encoded bit stream based on the data CRC indicator:
        analyzing both the audio-encoded bit stream and the series of decoded digital audio samples to estimate at least one of a distribution, extent and location of bit errors in the audio-encoded bit stream,
        selecting a first one of a plurality of means for producing a series of digital audio samples representative of the portion of the audio signal based on determining that there is at least one of a first estimated distribution, extent and location of bit errors in the audio-encoded bit stream and selecting a second one of the plurality of means for producing the series of digital audio samples representative of the portion of the audio signal based on determining that there is at least one of a second estimated distribution, extent and location of bit errors in the audio-encoded bit stream, and
    converting the series of digital audio samples produced by the selected means into a form suitable for playback to a user.

17. The method of claim 16, wherein receiving the audio-encoded bit stream over a communication channel comprises:
    receiving the audio-encoded bit stream as part of a packet transmitted over an Extended Synchronous Connection-Oriented (eSCO) communication channel.

18. The method of claim 16, wherein selecting the first or second one of the plurality of means for producing the series of digital audio samples representative of the portion of the audio signal comprises:
    selecting a packet loss concealment (PLC) block to produce the series of digital audio samples.

19. The method of claim 16, wherein selecting the first or second one of the plurality of means for producing the series of digital audio samples representative of the portion of the audio signal comprises:
    selecting an audio decoder that decodes the audio-encoded bit stream to produce the series of digital audio samples.

20. The method of claim 19, wherein selecting the audio decoder that decodes the audio-encoded bit stream to produce the series of digital audio samples comprises:
    selecting an audio decoder that decodes the audio-encoded bit stream in accordance with a Continuously Variable Slope Delta Modulation (CVSD) decoding technique.

21. The method of claim 16, wherein selecting the first or second one of the plurality of means for producing the series of digital audio samples representative of the portion of the audio signal comprises:
    selecting an audio decoder to decode a first portion of the audio-encoded bit stream to produce a first portion of the series of digital audio samples; and
    selecting a packet loss concealment (PLC) block to produce a second portion of the series of digital audio samples.

22. The method of claim 16, further comprising:
    generating one or more indicators that indicate a quality of a wireless link over which the communication channel was established;
    wherein the selecting step comprises selecting the first or second one of the plurality of means for producing the series of digital audio samples representative of the portion of the audio signal based on determining that there is at least one of the first or second estimated distribution, extent and location of the bit errors and the indicator(s).

23. The method of claim 16, wherein the selecting step comprises selecting the first or second one of the plurality of means for producing the series of digital audio samples representative of the portion of the audio signal based on determining that there is at least one of the first or second estimated distribution, extent and location of the bit errors and an analysis of one or more previously-received portions of the audio signal.

24. A system, comprising:
    a demodulator/channel decoder configured to receive a modulated carrier signal from an antenna and to generate an audio-encoded bit stream representative of a portion of an audio signal therefrom, the demodulator/channel decoder being further configured to generate a data cyclic redundancy check (CRC) indicator associated with the audio-encoded bit stream;
    an audio decoder configured to decode the encoded bit stream to produce a series of decoded digital audio samples;
    a bit error detection and concealment block configured to determine if bit errors are present in the audio-encoded bit stream based on the data CRC indicator and, responsive to determining that bit errors are present in the audio-encoded bit stream,
        to analyze both the audio-encoded bit stream and the series of decoded digital audio samples to estimate at least one of a distribution, extent and location of the bit errors in the audio-encoded bit stream,
        to select a first one of a plurality of means for producing a series of digital audio samples representative of the portion of the audio signal based on determining that there is at least one of a first estimated distribution, extent and location of the bit errors in the audio-encoded bit stream; and
        to select a second one of the plurality of means for producing the series of digital audio samples representative of the portion of the audio signal based on determining that there is at least one of a second estimated distribution, extent and location of bit errors in the audio-encoded bit stream; and a digital to analog converter configured to convert the series of digital audio samples produced by the selected means into an analog audio signal suitable for playback to a user.

25. The system of claim 24, wherein the modulated carrier signal is received over an Extended Synchronous Connection-Oriented (eSCO) communication channel.

26. The system of claim 24, wherein the plurality of means for producing the series of digital audio samples representative of the portion of the audio signal comprises:
   a packet loss concealment (PLC) block configured to produce a series of synthesized digital audio samples representative of the portion of the audio signal.

27. The system of claim 24, wherein the plurality of means for producing the series of digital audio samples representative of the portion of the audio signal comprises:
   an audio decoder.

28. The system of claim 27, wherein the audio decoder comprises a Continuously Variable Slope Delta Modulation (CVSD) decoder.

29. The system of claim 24, wherein the demodulator/channel decoder is further configured to generate one or more indicators that indicate a quality of a wireless link over which the communication channel was established; and
   wherein the bit error detection and concealment block is configured to select the first or second one of a plurality of means for producing the series of digital audio samples representative of the portion of the audio signal based on determining that there is at least one of the first or second estimated distribution, extent and location of the bit errors and the indicator(s).

30. The system of claim 24, wherein the bit error detection and concealment block is configured to select the first or second one of a plurality of means for producing the series of digital audio samples representative of the portion of the audio signal based on determining that there is at least one of the first or second estimated distribution, extent and location of the bit errors and an analysis of one or more previously-received portions of the audio signal.

* * * * *

UNITED STATES PATENT AND TRADEMARK OFFICE
CERTIFICATE OF CORRECTION

PATENT NO. : 8,578,247 B2
APPLICATION NO. : 12/431184
DATED : November 5, 2013
INVENTOR(S) : Robert W. Zopf et al.

It is certified that error appears in the above-identified patent and that said Letters Patent is hereby corrected as shown below:

On Title page, item (75), in "Inventors", column 1, line 1, Delete "Ranch Santa Margarita" and insert -- Rancho Santa Margarita --, therefor.

Signed and Sealed this
Fourth Day of March, 2014

Michelle K. Lee
*Deputy Director of the United States Patent and Trademark Office*